United States Patent Office 3,770,768
Patented Nov. 6, 1973

---

3,770,768
ALIPHATICALLY UNSATURATED ORGANO-
POLYSILOXANES
Fred F. Holub and Abe Berger, Schenectady, and Bruce
B. Hardman, Mechanicville, N.Y., assignors to General
Electric Company
No Drawing. Filed Mar. 1, 1971, Ser. No. 119,837
Int. Cl. C07d 27/18, 27/52
U.S. Cl. 260—326 E                         5 Claims

ABSTRACT OF THE DISCLOSURE

Organopolysiloxanes are provided wherein the organopolysiloxanes have either a terminal amino or aliphatically unsaturated imido group attached at one end and an alkenyl group attached at the other end, said amino or imido groups being attached to silicon through carbon-silicon bonds.

---

This invention relates to novel aliphatically unsaturated organopolysiloxanes which have terminal amino or aliphatically unsaturated imido radicals attached at one end and an alkenyl group attached at the other end. Because of the presence of the alkenyl silane bond and the amino or aliphatically unsaturated imido group, it is possible to incorporate the latter composition into silicon hydride fluids, resins, elastomers, etc., via a platinum catalyzed hydrosilylation reaction.

As an illustration, the novel imidoalkyldisiloxanes can be grafted onto polyolefins e.g. polyethylene, polypropylene, through the alkenyl silicon linkage and can be homopolymerized through the maleimide portion to obtain polymers with unique properties. Thus, in addition to providing tough films exhibiting corona resistance, they show good adhesion to aluminum surfaces, excellent releasing properties and resistance to deformation at high temperatures. In the cured state, the compositions herein described and claimed can be used as high temperature insulation for electrical conductors.

In accordance with the present invention, we have discovered a class of novel unsaturated organopolysiloxanes having the formula:

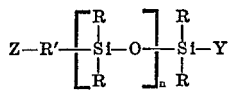

wherein

R is a lower alkyl radical (including cycloalkyl radicals of from 1 to 6 carbon atoms), phenyl or mixtures thereof;
R' is a divalent alkylene radical having 1-6 carbon atoms (including methylene, ethylene, propylene, butylene, and pentylene);
Y is vinyl, allyl, methallyl or styryl (ortho, meta, or para);
Z is amino or an aliphatically unsaturated imido group; and
n is an integer equal to at least 1, e.g., from 1 to 1,000 or more. The terminally functional groups Y and Z are attached directly to silicon atoms by carbon-silicon bonds. Thus, while the Y group is alkenyl in character, the Z group may be subdivided into Subclass A having an amino group and Subclass B having an aliphatically unsaturated imido group.

The Subclass A having the amino functional group may be expressed by the formula:

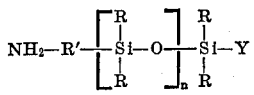

wherein R, R', Y, and n are defined hereinabove. These compounds may be prepared by a base catalyzed equilibration reaction as illustrated by the specific reaction,

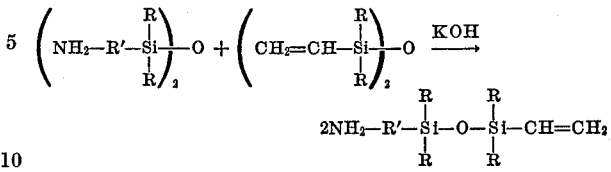

wherein R and R' are defined hereinabove. This reaction occurs at temperatures about 25–200° C., and preferably between 80–120° C.

Subclass B having an aliphatically unsaturated imido group may be expressed by the formula:

(3)

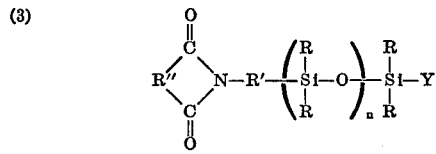

wherein R, R', Y, and n are defined hereinabove. The symbol R" is a divalent aliphatically unsaturated radical selected from the group consisting of radicals having the structure.

(a) 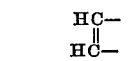

(b) 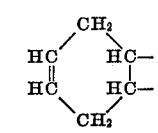

(c) 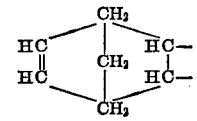

and (d) 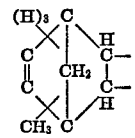

These aliphatically unsaturated imido compounds may be prepared by a condensation reaction between an aliphatically unsaturated anhydride (e.g. maleic anhydride, tetrahydrophthalic anhydride, and endomethylenetetrahydrophthalic anhydride) and the aminoorganosiloxane of Subclass A is illustrated, for example, by the equation:

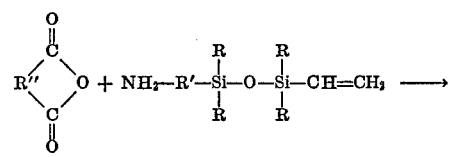

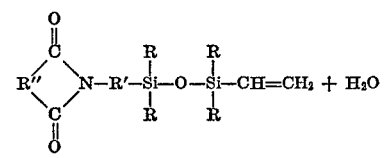

wherein R, R' and R" are defined hereinabove. The reaction occurs in the presence of acetic anhydride and sodium acetate and/or in solvents such as dimethylformamide and N-methylpyrrolidone, and the like.

The organopolysiloxanes of the present invention can be blended with aliphatically unsaturated organic materials, such as aliphatically unsaturated organic monomers, and organic polymers. Blends of the organopolysiloxanes and aliphatically unsaturated organic material can be made over wide proportions by weight. Experience has shown that there should be employed at least about 15%, by weight, of the organopolysiloxanes to provide for cured products exhibiting such valuable characteristics as corona resistance, solvent resistance, flexibility, etc. Depending upon the proportion of the organopolysiloxane and the aliphatically unsaturated monomer or polymer, the curable blends can provide for laminates, solventless varnishes, molding compounds, coating compositions, etc. Included by the aliphatically unsaturated monomers that can be employed in combination with the organopolysiloxanes are, for example, styrene, diallylphthalate, vinyl chloride, isobutylene, butadiene and isoprene; vinyl esters of organic carboxylic acid, such as vinyl formate, vinyl acetate; acrylic esters, such as methyl-, ethyl-, butyl-, etc.; esters of acrylic and methacrylic acids, etc.; and others such as acrylonitrile, divinylbenzene, triallyl citrate, triallyl cyanurate, N-vinyl phthalimide, N-allyl phthalimide, N-allyl phthalimide, N-allyl tetrachlorophthalimide, bis (endomethylenetetrahydrophthalimide) of methylenedianiline, bismaleimide of methylenedianiline and mixtures with methylenedianiline and the bismaleimide of methylenedianiline, etc. Among the organic polymers that can be employed in combination with the organopolysiloxanes of the present invention are, for example, polyvinylchloride, polyethylene, polypropylene, polycarbonates, polysulfones, polystyrene, polyurethanes, polyesters, polyphenyleneoxides, acrylonitrile-butadiene-styrene terpolymers, propylene-ethylene copolymers, etc.

In addition to the aforementioned aliphatically unsaturated monomers and organic polymers which can be employed with the polysiloxanes, there also can be employed in proportions, per 100 parts of the organopolysiloxane, 0 to 200 parts of fillers such as treated clay, ground quartz, fume silica, sand, carbon black, glass fibers, glass beads, carbon fiber, boron fiber, quartz fiber, etc. In addition, other ingredients can be utilized in an amount of from 60% to 90% by weight of the total composition, such as solvents including N-methyl pyrrolidone, dimethylacetamide, toluene, methylene chloride, methylacetate, methylethylketone, and plasticizers such as trioctyl trimellitate, diisodecylphthalate, etc.

Our invention is further illustrated by the following examples. Unless otherwise indicated, all parts are by weight.

EXAMPLE I

Preparation of 1-($\delta$-aminobutyl)-3-vinyltetramethyldisiloxane

A mixture of 0.2 mole (55.2 grams) 1,3-bis($\delta$-aminobutyl)tetramethyldisiloxane and 0.2 mole (37.2 grams) 1,3-bis(vinyl)tetramethyldisiloxane were heated at 90° C. for 2–3 hours in the presence of 1.0 gram of potassium hydroxide. The basic catalyst was neutralized with an equivalent amount of a dilute hydrochloric acid solution, followed by two aqueous washings. Upon distillation under vacuum, a 60% yield of 1-$\delta$-aminobutyl)-3-vinyltetramethyldisiloxane (B.P. 84° C./0.85 mm. Hg) was obtained. An infrared spectrum of this material showed absorption (microns) for vinyl (3.2, 6.2, 7.1, 9.9, 10.4), primary amine (2.9, 3.0), and a broad band at 6.1–6.3.

EXAMPLE II

Preparation of 1-($\delta$-tetrahydrophthalimidobutyl)-3-vinyltetramethyldisiloxane A reaction mixture of 0.273 mole (63 grams) 1-($\delta$-aminobutyl)-3-vinyltetramethyldisiloxane as prepared in Example I above and 0.273 mole (41 grams) tetrahydrophthalic anhydride was combined in 100 cc. anhydrous dimethylformamide and allowed to stir ambient temperatures for two days. The reaction mixture was poured into water and the organic phase was separated. The organic phase was extracted with chloroform and the chloroform layer was dried with $MgSO_4$ and filtered. The dried extract was then distilled over at 187° C./2 mm. Hg and there was obtained 85 grams of 1 - ($\delta$-tetrahydrophthalimidobutyl) - 3 - vinyltetramethyldisiloxane. The product was identified by IR analysis and its purity by vapor phase chromatography was greater than 98%.

EXAMPLE III

Preparation of 1-($\delta$-maleimidobutyl)-3-vinyltetramethyldisiloxane

Following the procedure of Example II, 0.273 mole (26.8 grams) maleic anhydride was combined with 0.273 mole (63 grams) 1-($\delta$-aminobutyl)-3-vinyltetramethyldisiloxane in 100 ml. of dimethylformamide. The reaction was exothermic. It was allowed to stir at room temperature for 6 hours and poured into 500 ml. ice water. The bottom layer (organic) was separated, dried with anhydrous magnesium sulfate and filtered.

The product was added to 3 molar equivalents of acetic anhydride and 1 molar equivalent of sodium acetate and placed on a steam bath for one hour. It was then diluted with two volumes of water, extracted into diethyl ether, dried and fractionated. The product B.P. 124° C./3 mm. Hg distilled over in a yield of 45%. The resulting product was identified by infrared analysis as 1-($\delta$-maleimidobutyl)-3-vinyltetramethyldisiloxane. The vaporphase chromatography purity was 97% and nuclear magnetic resonance spectrum was consistent with the proposed structure.

EXAMPLE IV

A mixture consisting of 20 parts of 1-($\delta$-maleimidobutyl)-3-vinyltetramethyldisiloxane in 80 parts of dimethylformamide, and 0.4 part dicumylperoxide was cast on a sheet of aluminum and heated one hour at 130° C. and then an additional hour at 200° C.

A tough flexible film resulted which showed excellent adhesion to the aluminum substrate and had a cut-through temperature of about 400° C. employing the procedure described in U.S. Pat. 2,936,296, issued May 10, 1960. The film also had excellent release characteristics which was illustrated by the fact that a transparent adhesive tape did not bond to the film.

EXAMPLE V

Preparation of 1-($\delta$-3,6-endomethylene-$\Delta^4$-tetrahydrophthalimidobutyl)-3-vinyltetramethyldisiloxane Following the procedure of Example II, a reaction mixture of molar equivalent quantities of ($\delta$-aminobutyl)-3-vinyltetramethyldisiloxane and 3,6 - endomethylene-$\Delta^4$-tetrahydrophthalic anhydride were combined in the presence of N,N-dimethylacetamide. An exothermic reaction was noted. The mixture was stirred for 2 hours at room temperature. The solvent was then stripped at reduced pressure. To the resulting product was added three equivalents of acetic anhydride and one equivalent sodium acetate and the reaction mixture heated on a steam bath for one hour. The reaction was poured onto ice water and the organic layer extracted two times with diethyl ether. The ether layer washed with 10% sodium carbonate solution until the washings were slightly basic, dried and stripped leaving behind a product which was identified both by nuclear magnetic resonance and infrared analysis as 1-(3,6-endomethylene-$\Delta^4$-tetrahydrophthalimidobutyl)-3-vinyltetramethyldisiloxane.

EXAMPLE VI

Following the procedure of Example I, 1-($\gamma$-aminopropyl)-3-allyltetramethyldisiloxane is equilibrated with octamethylcyclotetrasiloxane using KOH catalyst to obtain 1-($\gamma$ - aminopropyl)-5-allylhexamethyltrisiloxane as one of the components by fractionation.

A mixture consisting of 1-(γ-aminopropyl)-5-allylhexamethyltrisiloxane and a molar equivalent amount of tetrahydrophthalic anhydride are combined in 100 ml. anhydrous dimethylformamide and allowed to stir at ambient temperatures for 2 days. The reaction mixture is poured into water and the organic phase separated and distilled to give 1-(γ-phthalimidopropyl)-5-allylhexamethyltrisiloxane.

It will be appreciated that the invention is not limited to the specific details shown in the examples and illustrations and that various modifications may be made within the ordinary skill in the art without departing from the spirit and scope of the invention.

We claim:

1. An aliphatically unsaturated organopolysiloxane of the formula:

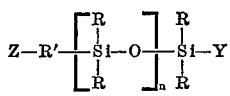

wherein

R is a member selected from the group consisting of methyl, phenyl and mixtures thereof;

R' is a divalent alkylene radical having 1–6 carbon atoms;

Y is a member selected from the group consisting of vinyl and allyl;

Z is an aliphatically unsaturated imido having the formula:

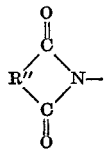

wherein R" is a divalent aliphatically unsaturated radical selected from the group consisting of radicals having the formula:

(a) 

(b) 
```
        CH₂
   HC⁄    ＼HC—
   HC      HC—
    ＼    ⁄
      CH₂
```

(c) 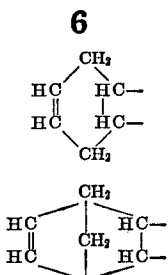

and (d) 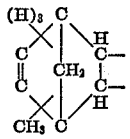

and n is an integer of about 1–1000.

2. The organopolysiloxane of claim 1, wherein the compound is 1-(δ tetrahydrophthalimidobutyl) - 3 - vinyltetramethyldisiloxane.

3. The organopolysiloxane of claim 1, wherein the compound is 1-(δ - maleimidobutyl)-3-vinyltetramethyldisiloxane.

4. The organopolysiloxane of claim 1, wherein the compound is 1-(δ - 3,6 - endomethylene-Δ⁴ - tetrahydrophthalimidobutyl)-3-vinyltetramethylenedisiloxane.

5. The organopolysiloxane of claim 1, wherein the compound is 1(γ - phthalimidopropyl)-5-allylhexamethylenetrisiloxane.

References Cited

UNITED STATES PATENTS 2,492,554  12/1949  Chodroff et al. _____ 260—326

JOSEPH A. NARCAVAGE, Primary Examiner

U.S. Cl. X.R.

252—63.7; 260—326.5 A, 824, 448.2 N